(12) United States Patent
Hawks (10) Patent No.: US 10,577,258 B2
(45) Date of Patent: Mar. 3, 2020

(54) SYSTEM AND METHOD FOR TREATING CONTAMINATED WATER

(71) Applicant: Wasserwerk, Inc., Columbia, MO (US)

(72) Inventor: Wayne R. Hawks, Columbia, MO (US)

(73) Assignee: WASSERWERK, INC., Columbia, MO (US)

( * ) Notice: Subject to any disclaimer, the term of this patent is extended or adjusted under 35 U.S.C. 154(b) by 0 days.

(21) Appl. No.: 15/877,039

(22) Filed: Jan. 22, 2018

(65) Prior Publication Data

US 2018/0141827 A1    May 24, 2018

Related U.S. Application Data

(60) Division of application No. 14/494,277, filed on Sep. 23, 2014, now abandoned, which is a continuation-in-part of application No. 14/208,005, filed on Mar. 13, 2014, now abandoned.

(Continued)

(51) Int. Cl.
    *C02F 1/04*    (2006.01)
    *C02F 1/28*    (2006.01)
    (Continued)

(52) U.S. Cl.
    CPC ............... *C02F 1/281* (2013.01); *B01D 3/14* (2013.01); *B01D 15/10* (2013.01); *C02F 9/00* (2013.01);
    (Continued)

(58) Field of Classification Search
    CPC .... C02F 9/00; C02F 9/005; C02F 1/04; C02F 1/281; C02F 1/40; C02F 1/484; C02F 1/66; C02F 1/74; B01D 3/14; B01D 3/32
    See application file for complete search history.

(56) References Cited

U.S. PATENT DOCUMENTS

| 1,962,153 A | 6/1934 | Peterkin, Jr. |
| 2,155,318 A | 4/1939 | Liebknecht |

(Continued)

FOREIGN PATENT DOCUMENTS

| CN | 200966961 Y | 10/2007 |
| WO | 2004094031 A1 | 11/2004 |

(Continued)

OTHER PUBLICATIONS

Best Management Products webpage for BMP SNOUT®, Feb. 3, 2011, 1 page, http://snoutsdirect.com/.

*Primary Examiner* — Jonathan Miller
(74) *Attorney, Agent, or Firm* — Husch Blackwell LLP (57) ABSTRACT

A water treatment system including a filter, an aerator, a hydrogen absorption manifold, a first treatment container, a second treatment container, a magnetron, a boiler, a superheater, a fractional distillation separator and a condenser. The filter is adapted for removing chloride ions and transmutated chlorine ions, while the hydrogen absorptive manifold is designed for absorbing hydrogen ions and reducing the pH of the water. The magnetron alters the spin of an electron in an outer shell of an atom contained in the water so that a solution added to the water coats selective elements causing them to precipitate from the water. The boiler and superheater may be utilized to convert the water to a superheated steam, while the fractional distillation separator is adapted for condensing and separating elements, including radioactive elements, from the superheated steam. A method for treating contaminated water using the water treatment system is also provided.

14 Claims, 9 Drawing Sheets

Related U.S. Application Data (60) Provisional application No. 61/779,668, filed on Mar. 13, 2013, provisional application No. 61/881,061, filed on Sep. 23, 2013.

(51) Int. Cl.

| | | |
|---|---|---|
| B01D 15/10 | (2006.01) | |
| B01D 3/14 | (2006.01) | |
| C02F 9/00 | (2006.01) | |
| C02F 1/30 | (2006.01) | |
| C02F 1/52 | (2006.01) | |
| C02F 1/40 | (2006.01) | |
| C02F 1/48 | (2006.01) | |
| C02F 1/66 | (2006.01) | |
| C02F 1/74 | (2006.01) | |
| C02F 101/00 | (2006.01) | |
| C02F 101/12 | (2006.01) | |

(52) U.S. Cl.
CPC .............. *C02F 1/04* (2013.01); *C02F 1/28* (2013.01); *C02F 1/283* (2013.01); *C02F 1/302* (2013.01); *C02F 1/40* (2013.01); *C02F 1/484* (2013.01); *C02F 1/5263* (2013.01); *C02F 1/66* (2013.01); *C02F 1/74* (2013.01); *C02F 2101/006* (2013.01); *C02F 2101/12* (2013.01); *C02F 2201/008* (2013.01); *C02F 2209/36* (2013.01)

(56) References Cited

U.S. PATENT DOCUMENTS

| | | | |
|---|---|---|---|
| 3,347,968 A | 10/1967 | Thomas et al. | |
| 3,523,076 A | 8/1970 | Goerz, Jr. et al. | |
| 4,139,420 A | 2/1979 | Stünkel | |
| 4,561,965 A | 12/1985 | Minkkinen | |
| 4,652,381 A | 3/1987 | Inglis | |
| 4,664,795 A | 5/1987 | Stegall et al. | |
| 4,783,242 A | 11/1988 | Robbins | |
| 4,997,568 A | 3/1991 | Vandervelde et al. | |
| 5,133,619 A | 7/1992 | Murfae et al. | |
| 5,281,332 A | 1/1994 | Vandervelde et al. | |
| 5,304,309 A | 4/1994 | Segupta | |
| 5,417,861 A | 5/1995 | Burnham | |
| 5,479,463 A | 12/1995 | Roberts | |
| 5,492,633 A | 2/1996 | Moniwa et al. | |
| 5,514,277 A | 5/1996 | Khudenko | |
| 5,632,896 A | 5/1997 | Vandervelde et al. | |
| 5,683,356 A | 11/1997 | Halperin et al. | |
| 5,814,227 A | 9/1998 | Pavlis | |
| 6,126,817 A | 10/2000 | Duran et al. | |
| 6,136,199 A | 10/2000 | Sengupta et al. | |
| 6,190,548 B1 | 2/2001 | Frick | |
| 6,221,245 B1 | 4/2001 | Colburn | |
| 6,268,596 B1 | 7/2001 | Lauf et al. | |
| 6,365,051 B1 | 4/2002 | Bader | |
| 6,663,766 B1 | 12/2003 | Adin et al. | |
| 7,081,203 B2 | 7/2006 | Helm | |
| 7,119,312 B2 | 10/2006 | Sedlmayr | |
| 7,288,188 B2 | 10/2007 | Al-Assfour | |
| 7,389,639 B2 | 6/2008 | Michalakos et al. | |
| 7,455,780 B1 | 11/2008 | Joyner et al. | |
| 7,479,215 B2 | 1/2009 | Carson et al. | |
| 7,527,736 B2 | 5/2009 | Shafer et al. | |
| 7,722,720 B2 | 5/2010 | Shafer et al. | |
| 7,758,747 B2 | 7/2010 | Bryant | |
| 7,824,552 B2 | 11/2010 | Slabaugh et al. | |
| 7,857,966 B2 | 12/2010 | Duran et al. | |
| 7,923,417 B2 | 4/2011 | Sanders et al. | |
| 7,928,040 B2 | 4/2011 | Sanders et al. | |
| 7,963,338 B1 | 6/2011 | Bader | |
| 8,012,358 B2 | 9/2011 | Slabaugh et al. | |
| 8,273,320 B2 | 9/2012 | Ditommaso et al. | |
| 8,366,936 B1 | 2/2013 | Jones | |
| 9,023,214 B2 | 5/2015 | Zolezzi-Garreton | |
| 9,475,713 B2 | 10/2016 | Zolezzi-Garreton | |
| 2001/0047956 A1 | 12/2001 | Albiston et al. | |
| 2002/0179531 A1 | 12/2002 | Sengupta et al. | |
| 2003/0066804 A1 | 4/2003 | Tipton et al. | |
| 2005/0034651 A1 | 2/2005 | Albiston et al. | |
| 2005/0098504 A1 | 5/2005 | Manz et al. | |
| 2005/0156136 A1 | 7/2005 | Sengupta et al. | |
| 2005/0288181 A1* | 12/2005 | Tranter | B01J 20/0229 502/400 |
| 2006/0163178 A1 | 7/2006 | Crawford et al. | |
| 2007/0039895 A1 | 2/2007 | Sengupta et al. | |
| 2007/0095823 A1 | 5/2007 | Sedlmayr | |
| 2007/0272609 A1 | 11/2007 | Suri et al. | |
| 2007/0284313 A1 | 12/2007 | Lee et al. | |
| 2008/0264859 A1 | 10/2008 | Willuweit | |
| 2009/0032446 A1 | 2/2009 | Wiemers et al. | |
| 2009/0057202 A1 | 3/2009 | Kulkarni et al. | |
| 2009/0065401 A1 | 3/2009 | Petri et al. | |
| 2009/0230059 A1 | 9/2009 | McGuire et al. | |
| 2010/0190666 A1 | 7/2010 | Ali et al. | |
| 2010/0218645 A1 | 9/2010 | Gedanken et al. | |
| 2010/0224495 A1 | 9/2010 | McGuire et al. | |
| 2010/0264014 A1 | 10/2010 | Mignon | |
| 2010/0282675 A1 | 11/2010 | Sengupta et al. | |
| 2011/0005999 A1 | 1/2011 | Randal | |
| 2011/0017677 A1 | 1/2011 | Evans | |
| 2011/0079503 A1 | 4/2011 | Heins et al. | |
| 2011/0127223 A1 | 6/2011 | Astley et al. | |
| 2011/0137465 A1 | 6/2011 | Angelilli et al. | |
| 2011/0152132 A1 | 6/2011 | Sanders et al. | |
| 2011/0152133 A1 | 6/2011 | Sanders et al. | |
| 2011/0240567 A1 | 10/2011 | Zolezzi-Garreton | |
| 2011/0272155 A1 | 11/2011 | Warren | |
| 2011/0290721 A1 | 12/2011 | Aho | |
| 2012/0006762 A1 | 1/2012 | McCabe | |
| 2012/0085530 A1 | 4/2012 | Kerfoot | |
| 2012/0097614 A1 | 4/2012 | Silva et al. | |
| 2012/0152830 A1 | 6/2012 | Shafer et al. | |
| 2012/0168157 A1 | 7/2012 | Ditommaso et al. | |
| 2012/0225800 A1 | 9/2012 | Hendrickson | |
| 2012/0234765 A1 | 9/2012 | Sengupta et al. | |
| 2012/0305496 A1 | 12/2012 | Zadyraka et al. | |
| 2012/0325469 A1 | 12/2012 | Olsen et al. | |
| 2013/0023448 A1 | 1/2013 | Glasscott et al. | |
| 2013/0118994 A1 | 5/2013 | Altman | |
| 2013/0228446 A1 | 9/2013 | Shumway | |
| 2013/0277288 A1 | 10/2013 | Borough et al. | |

FOREIGN PATENT DOCUMENTS

| | | | |
|---|---|---|---|
| WO | 2008151208 A1 | 12/2008 | |
| WO | 2009102593 A1 | 8/2009 | |

* cited by examiner

SYSTEM AND METHOD FOR TREATING CONTAMINATED WATER

CROSS-REFERENCE TO RELATED APPLICATIONS

This Application is a Divisional of and claims priority to U.S. patent application Ser. No. 14/494,277, filed on Sep. 23, 2014, to Wayne R. Hawks entitled "System and Method for Treating Contaminated Water," currently pending, the entire disclosure of which is incorporated herein by reference, which is a Continuation-in-Part of and claims priority to U.S. patent application Ser. No. 14/208,005, filed on Mar. 13, 2014, to Wayne R. Hawks entitled "System and Method for Treating Contaminated Water," now abandoned, the entire disclosure of which is incorporated herein by reference, which claims priority to U.S. Provisional Patent Application Ser. No. 61/779,668, filed on Mar. 13, 2013, to Wayne R. Hawks entitled "System and Method for Treating Fracturing Water," the entire disclosure of which is incorporated herein by reference. U.S. patent application Ser. No. 14/494,277 also claims priority to U.S. Provisional Patent Application Ser. No. 61/881,061, filed on Sep. 23, 2013, to Wayne R. Hawks entitled "System and Method for Treating Fracturing Water," the entire disclosure of which is incorporated herein by reference.

BACKGROUND OF THE INVENTION

Hydraulic fracturing (or "fracking") is a well-known process utilized by the oil and gas industry to create and enlarge fractures in underground shale formations. The fractures allow oil and natural gas to move more freely through the shale formations and ultimately flow to the surface. In the fracking process, explosions are set off to create the fractures and then high-pressure fluid is injected into the well in order to perpetuate the fracturing and hold the fractures open.

The fracturing fluid is typically comprised of water containing a proppant and chemical solution mixed therein. The fracturing fluid is often composed of between about 98-99.5% water and sand with the additional chemical solution accounting for about 0.5-2%. The water includes, in significant part, freshwater that must be transported to the well site by tanker truck or piping. The proppant, which is often sand or a similar material, is used to keep the fractures from closing after the injection has stopped. The chemical solution includes a variety of additives having dosage rates that vary with the location and condition of the specific well. These additives may include, but are not limited to, acids (e.g., hydrochloric acid), corrosion inhibitors (e.g., alcohols, organic acids, polymers, sodium salt, glycol and amide), iron control chemicals (e.g., sodium compounds and citric acid), antibacterial agents, biocides (e.g., gluteraldhyde, alcohols, sodium salt, sodium hydroxide and bromide salt), scale inhibitors (e.g., alcohols, organic acids, polymers, sodium salt, glycol and amide), friction reducers (e.g., polymers, hydrocarbons and water soluble polymers), surfactants (e.g., alcohols, glycols and hydrocarbons), gelling agents (e.g., guar gum, hydrocarbons and polymers), breakers (e.g., ammonium persulfate, sodium and potassium salts) and crosslinkers (e.g., polyol and borax).

The fracking process typically requires between about one million and five million gallons of water or more per well. A portion of the water that is injected into the well returns to the surface as "flowback water." While the flowback water returns to the surface over a period of three to four weeks, most of the flowback water returns within the first seven to ten days. The volume of recovery is generally between about 20-60% of the volume that was initially injected into the well. The rest of the fluid is absorbed in the shale formation. At a certain point, there is a transition from primarily recovering flowback water to primarily recovering "produced water," which is water naturally occurring in the shale formation that flows to the surface over the life of the well.

Upon returning to the surface and exiting the well, the flowback water and produced water is generally collected in tanks, open pools or lagoons located near the well. From there, the flowback water and produced water is pumped into tanker trucks and transported from the well site to a deep disposal well where the water is placed back into the ground. Each disposal well typically costs several million dollars to drill and maintain. Disposal wells can additionally create environmental and water source contamination concerns.

The flowback water and produced water is typically contaminated with man-made and naturally-occurring substances. The water is contaminated with the spent chemicals that are mixed into the fracking water prior to its injection into the well, as discussed above. The water is also contaminated with naturally-occurring substances residing below the Earth's surface. For example, the water may have elevated levels of Kjeldahl nitrogen, petroleum residue, sodium, ammonia, chloride, sulfate, chloride sulfate, total dissolved solids (TDS), chloride, barium, strontium, boron, benzene, ethylbenzene, toluene, xylene, glycols, 2-butoxyethanol, radionuclides such as radium isotopes (e.g., radium-226 and radium-228), uranium-238 and lead-210 and other naturally occurring radioactive material ("NORM") found in the shale formations. Additionally, some scientists believe that the explosions occurring during the fracturing of the shale formation set off chain reactions that result in the creation of radioactive material in addition to the NORM already present in the shale formations.

In order for the flowback water and the produced water to be reused as fracturing water or discharged to the environment, it must first be treated. As such, a need exists for a system and method for treating contaminated flowback water and produced water such that it can be reused and the cost and environmental concerns resulting from the disposal wells can be eliminated. A particular need exists for a system and method for removing radioactive materials from flowback water and produced water. A further need exists for a system that is self-contained and is mobile between well sites and may be scaled up or down depending upon the amount and quality of the water to be treated.

SUMMARY OF THE INVENTION

One embodiment of the present invention is directed to a water treatment system that includes a filter, an aerator, a hydrogen absorption manifold, a first treatment container, a second treatment container, a magnetron, a boiler, a superheater, a fractional distillation separator and a condenser.

The filter can be in the form of a filter compartment having a material therein suitable for removing chloride ions and transmutated chlorine ions from water passing through the system and also absorbing neutrons from the water. The material may comprise a first filter material suitable for removing chloride ions and a second filter material suitable for absorbing neutrons. The first filter material can comprise at least one of coconut carbon, silicon dioxide and ionized sand. The second filter material can comprise at least one of cadmium and bismuth. The aerator is suitable for oxygenating the water and may be located at an exit end of the filter compartment.

The hydrogen absorptive manifold is designed for absorbing hydrogen ions and reducing the pH of the water. The absorptive manifold may be constructed of an outer tube surrounding an inner plate or tube having a plurality of fins extending therefrom. The fins can be constructed from gold, silver, palladium, nickel, zinc, tin, indium and/or copper. The fins may also be adapted for altering at least one of a phosphate, a salt, a nitrite and a nitrate from a reactive form to a nonreactive form. The absorptive manifold may further include an electromagnet for controlling electromagnetic radiation.

The first treatment container, which may be in the form of a concrete containment basin, is in fluid communication with the absorptive manifold. The first container may include a voltage accelerator, such as a P dope N dope voltage accelerator, for inducing a charge in the water. The voltage accelerator may include a positively charged plate and a negatively charged plate submerged in the water within the first container. The first container may also include first pollutant collection substrate contained in a hanging bag which may include silicon dioxide, calcium carbonate and/or cadmium. An oil snout may further be included in the first container for capturing oil and benzene molecules from the water. The second treatment container, which may also be in the form of a concrete containment basin, is in fluid communication with the first container and may include a screen therein that includes at least one of nickel and calcium carbonate.

The magnetron may be adapted for altering the spins of electrons in the outer shells of atoms of contaminants contained in the water being treated. In one embodiment, the magnetron includes a clear plastic tube or pipe passing through or adjacent to a microwave generating device. The application of microwaves generated by the magnetron can alter the angular momentums of the electrons in the outer shells of the atoms of contaminants ontained in the water. It will be appreciated that the magnetron may reverse a spin of the electrons in the outer shells of the atoms contained in the water. In that regard, upon being subjected to microwaves in the magnetron, a spin of an electron that is originally an up spin ($m_s$ of +½) is reversed to a down spin ($m_s$ of −½), and a spin of an electron that is originally a down spin ($m_s$ of −½) is reversed to an up spin ($m_s$ of +½). The alteration or reversal in electron spin enables selective elements to be coated, at least partially, with a solution so that such elements may be precipitated from the water. A port can be located adjacent (e.g., downstream) of the magnetron, the port being operable for permitting a solution to be added the water after the water has passed through the magnetron. The solution may comprise at least one of an acidic solution of ethyl diamine, tetra-acidic acid, ethylenediaminetetraacetic acid (EDTA), citric acid, lemon juice, orange juice, and/or lime juice. As set forth above, it will be understood that the solution can cause contaminants to precipitate from the water.

In one embodiment, the system includes a heater comprised of a boiler and a superheater. The boiler may be adapted for converting the water into a saturated steam, while the superheater can be designed to convert the saturated steam to a superheated steam. The superheated steam may be directed to a fractional distillation separator configured for condensing elements, including radioactive elements, by atomic mass units. The fractional distillation separator includes a plurality of internal plates, each having an aperture defined therethrough. Extending upwardly from each aperture may be a pipe that is topped with a dome-shaped cap configured for condensing elements by atomic mass units. The condensed elements may flow from the fractional distillation separator via apertures defined in an outer shell adjacent the caps. The system may further include a condenser in fluid communication with an outlet of the fractional distillation separator for condensing the steam flowing from the fractional distillation separator.

Another aspect of the present invention is directed to a method for treating contaminated water including the steps of: collecting contaminated water, filtering the water to remove hydrogen ions, directing the water through an absorptive manifold to absorb hydrogen ions and removal of neutrons and inducing a charge in the water with a voltage accelerator.

The method may also include the steps of: passing the water through a magnetron device and adding a solution to the water thereafter for coating selective elements with the solution so that such elements will precipitate from the water. The method may also include the steps of: boiling the water to create saturated steam, heating the saturated steam to convert the saturated steam to a superheated steam, introducing the superheated steam to a fractional distillation separator, separating contaminants from the superheated steam in the fractional distillation separator and condensing the steam upon discharge from the fractional distillation separator.

Other aspects and advantages of the present invention will be apparent from the following detailed description of the preferred embodiments and the accompanying drawing figures.

DESCRIPTION OF THE SEVERAL VIEWS OF THE DRAWINGS

In the accompanying drawings, which form a part of the specification and are to be read in conjunction therewith in which like reference numerals are used to indicate like or similar parts in the various views.

DETAILED DESCRIPTION OF THE INVENTION

The invention will now be described with reference to the drawing figures, in which like reference numerals refer to like parts throughout. For purposes of clarity in illustrating the characteristics of the present invention, proportional relationships of the elements have not necessarily been maintained in the drawing figures. It will be understood that some of the drawing figures depict a working, batch-scale, pilot embodiment. As set forth below, the water treatment system of the present invention can be scaled up to meet the throughput requirements associated with treating contaminated water in various large-scale scenarios.

The following detailed description of the invention references specific embodiments in which the invention can be practiced. The embodiments are intended to describe aspects of the invention in sufficient detail to enable those skilled in the art to practice the invention. Other embodiments can be utilized and changes can be made without departing from the scope of the present invention. The present invention is defined by the appended claims and the description is, therefore, not to be taken in a limiting sense and shall not limit the scope of equivalents to which such claims are entitled.

The entire disclosures of pending U.S. patent application Ser. No. 13/627,765, filed on Sep. 26, 2012 to Wayne R. Hawks entitled "Self-Container Irrigation Treatment System" and U.S. application Ser. No. 13/219,080, filed on Aug. 26, 2011 to Wayne R. Hawks entitled "Self-Container Irrigation Treatment System" are incorporated herein by reference. The terms "contaminated water" and "water," when used independently of any adjectives herein, shall refer to either one or all of fracking water, flowback water, produced water or other contaminated water treated by the system of the present invention.

Figure 1:
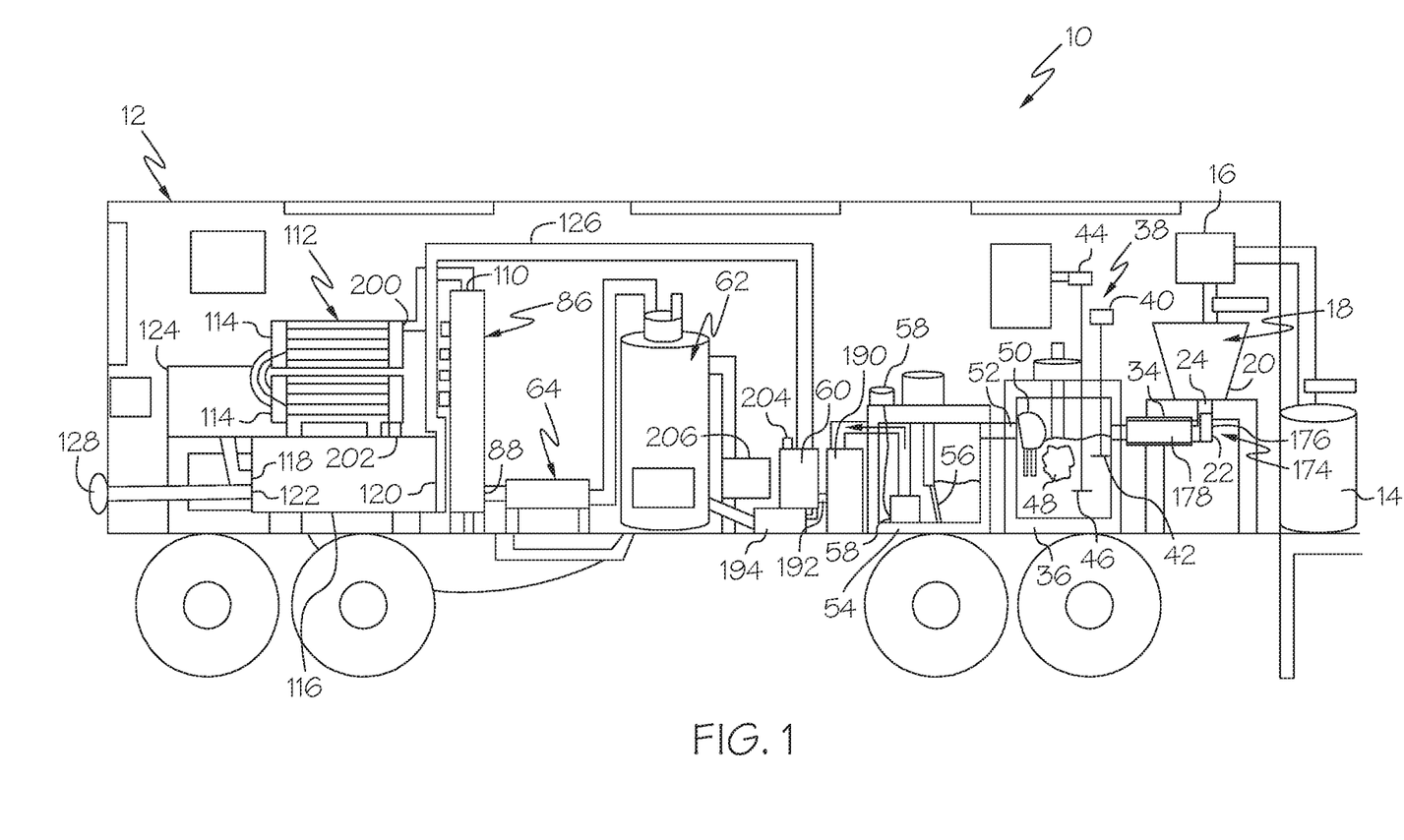
FIG. 1 is a schematic side view of a system for treating contaminated water in accordance with one embodiment of the present invention.
Figure 2:
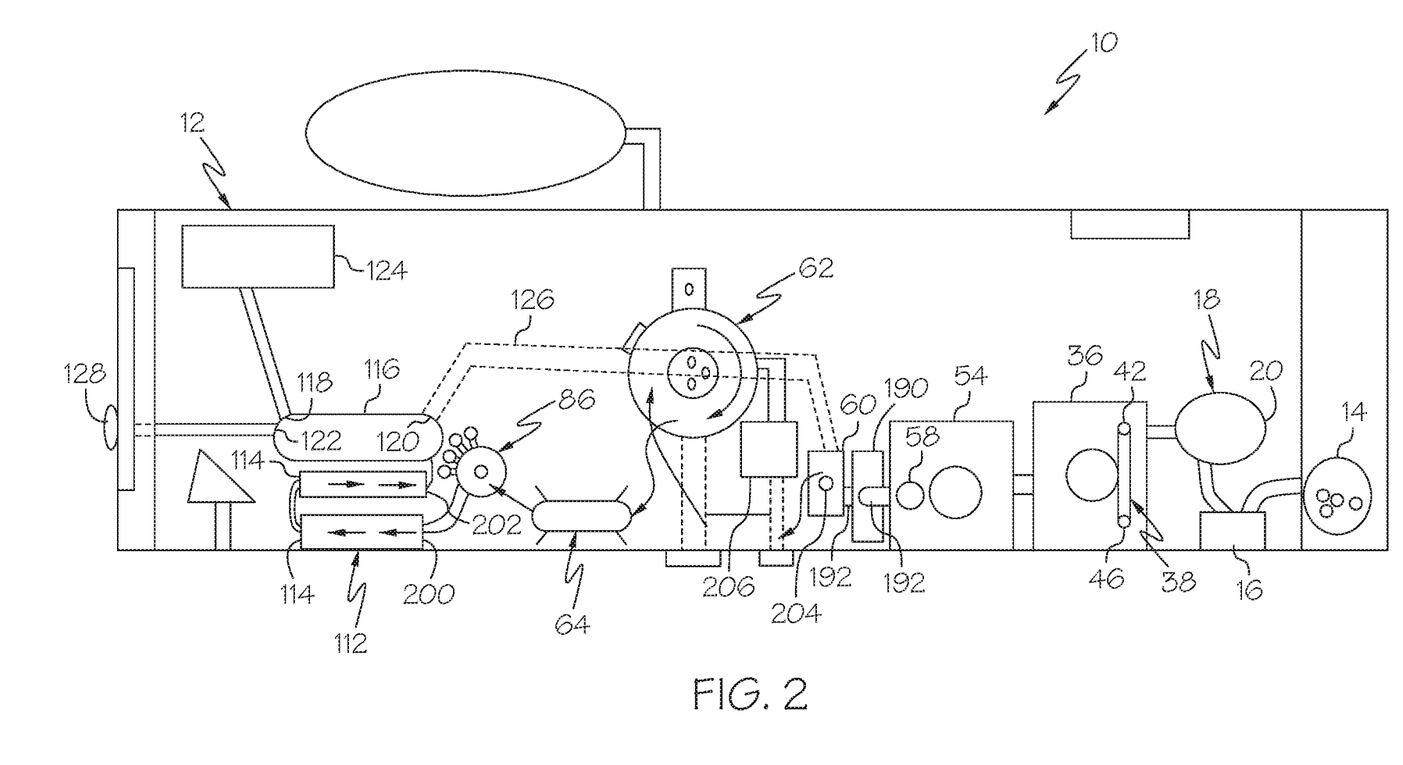
FIG. 2 is a schematic top view of a system for treating contaminated water in accordance with one embodiment of the present invention.

FIGS. 1 and 2 generally illustrate one embodiment of the system 10 of the present invention, which may optionally be contained within one or more mobile semi-trailers 12. Alternatively, the system 10 may be stationary or may be transportable through various other modes, including but not limited to, trucks, trains, planes, boats and barges.

As illustrated, the system 10 is normally located adjacent a source of contaminated water 14, which may come directly from a well or may be contained within one or more tanks, barrels, open pools, lagoons or ponds near the well. The source of water 14 may include fracking water, flowback water, produced water, water used in coal production and dust control, water used in coal-fired power plants, water used in nuclear power plants, water from contaminated reservoirs, ponds, rivers and streams or any other source of contaminated water. A pump 16 may be provided to transport the contaminated water into the system 10. In other embodiments, the system 10 can be positioned at a location having an elevation lower than that of the contaminated water so that the contaminated water may flow into the system 10 via gravity.

Figure 3:
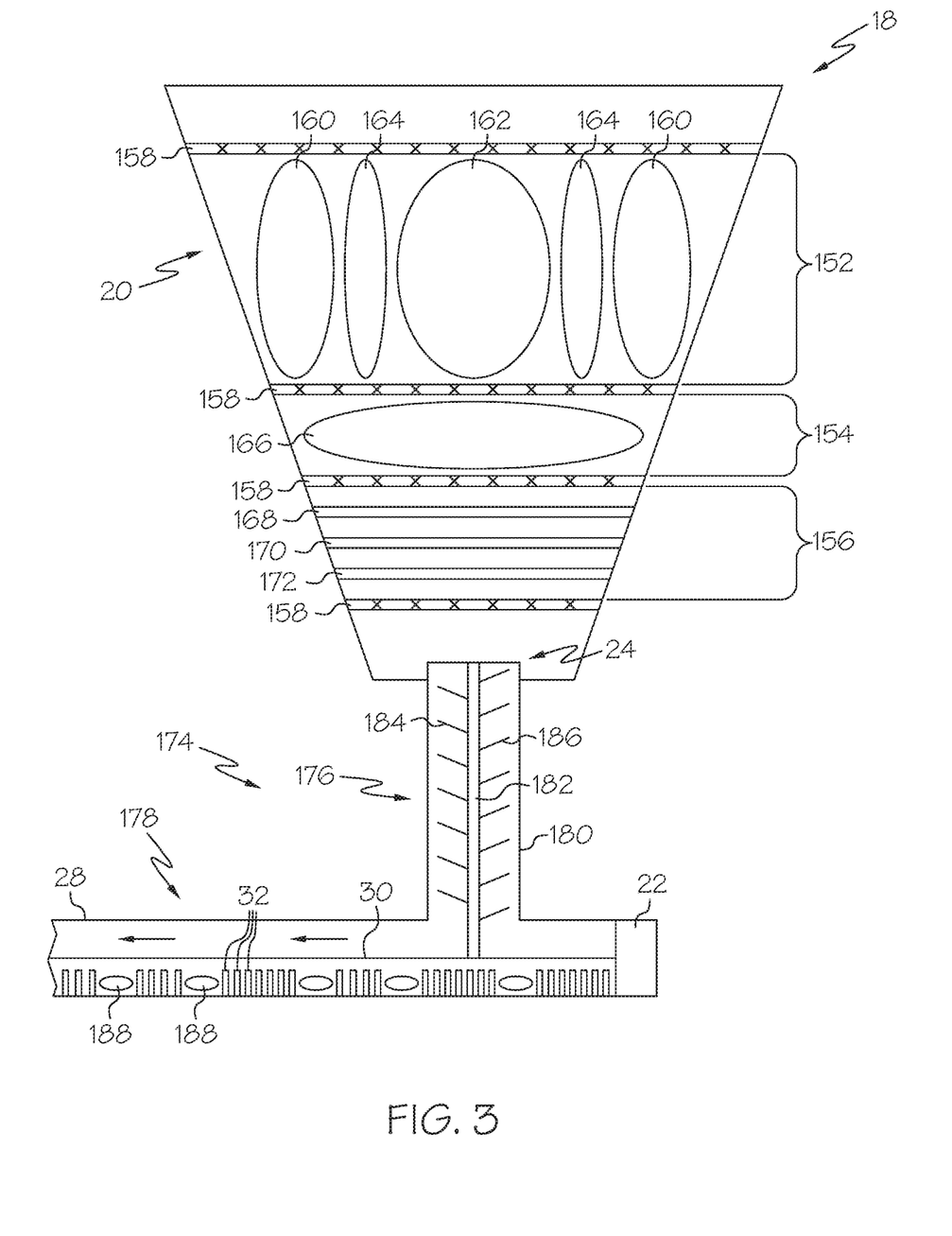
FIG. 3 is a schematic sectional side view of a clarifier and an absorptive manifold for reducing the pH of water in accordance with one embodiment of the present invention.

As illustrated in FIG. 3, the system 10 may include a filter or clarifier 18 comprising a tapered canister or filter compartment 20 that contains coconut carbon (i.e., activated carbon made from coconut shells), ionized silicon dioxide (i.e, $SiO_2$ or sand) and/or cadmium (Cd) for removing chloride and transmutated chlorine ions ($Cl^-$) and absorbing any neutrons. The cadmium acts as a neutron absorber and the sand, which is silicon dioxide, ties up chlorine ions. In one embodiment, multiple sources of water may, either simultaneously or independently, flow into the clarifier 18 through a plurality of spouts. These sources of water may include, but are not limited to, fracking water, flowback water, produced water, processed water or water from any other source. The flow from each of these sources may be controlled at different rates in order to achieve a consistency of water required for processing by the system 10.

In one embodiment, the clarifier 18 may divided into three sections—an upper section 152, a middle section 154 and a lower section 156—defined by dividers 158 that may be constructed from a stainless steel mesh material, for example.

As shown, the upper section 152 of the clarifier 18 comprises one or more substrate bags 160 having coconut carbon therein. The bags 160 with coconut carbon may be located around an exterior of the upper section 152. One or more bags 162 containing ionized silicon dioxide may be located at an interior of the upper section 152 for absorbing chlorine ions and slowing neutron action. Finally, one or more bags 164 containing graphite, which acts as a moderator, may be located between the bags 160 of coconut carbon and bags 162 of ionized silicon dioxide.

As depicted, a substrate bag 166 containing cadmium is located in the middle section 154 of the clarifier 18. The cadmium, which acts as a neutron absorber, can be arranged in a plurality of layers within the bag 166.

As illustrated, the lower section 156 of the clarifier 18 includes a sheet 168 of gold (Au), a sheet 170 of bismuth (Bi) and a sheet 172 of silver (Ag). The gold sheet 168 is non-reactive to neutrons and allows neutrons to pass therethrough. Any neutrons that are not absorbed by the cadmium in the middle section 154 may be absorbed by the sheet 170 of bismuth in the lower section 156. Over time, the sheet 170 of bismuth will convert to polonium. The polonium will then transmutate into lead, which is stable.

When the water exits the clarifier 18, it may enter a hydrogen absorptive manifold 174 adapted for absorbing hydrogen ions and reducing the pH of the water. The hydrogen absorptive manifold 174 can be placed downstream of and in communication with an exit end 24 of the filter compartment 20. In one embodiment, as best illustrated in FIG. 3, the manifold 174 includes a generally vertical section 176 and a generally horizontal section 178.

The vertical section 176 of the manifold 174 may include an outer pipe 180, which may be formed of copper (Cu) or other suitable material, surrounding an inner plate or tube 182, which also may be formed of copper or other suitable material. A plurality of gold fins 184 and a plurality of palladium (Pd) fins 186 can extend from the inner plate or tube 182 within an interior of the manifold 174. The outer copper pipe 180 may be effective for absorbing and concentrating hydrogen ions onto the palladium fins 186.

Figure 4A:
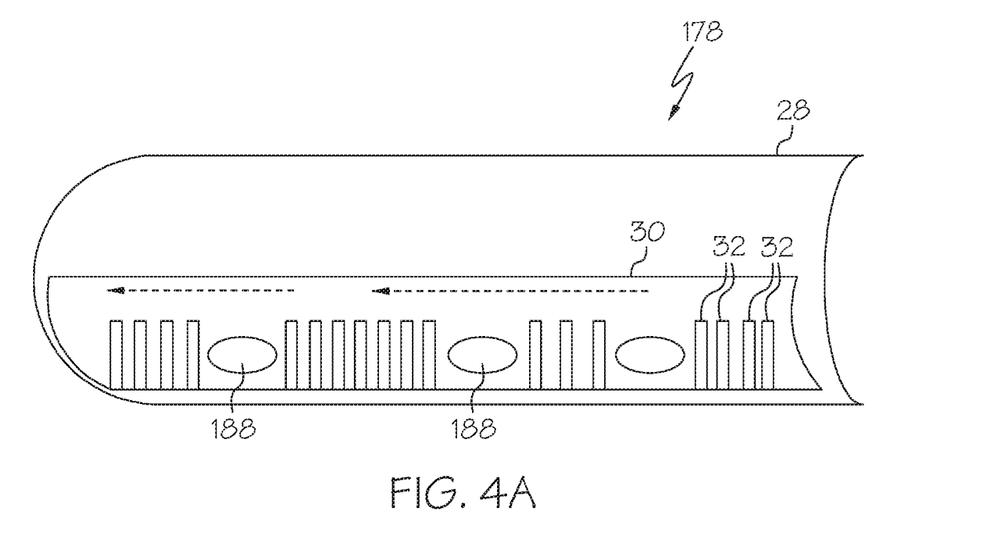
FIG. 4A is a schematic sectional side view of an absorptive manifold for reducing the pH of water in accordance with one embodiment of the present invention.

The horizontal section 178 of the manifold 174 may comprise an outer pipe 28, which may be formed of copper or other suitable material, surrounding an inner plate or tube 30, which also may be formed of copper or other suitable material. The inner plate or tube 30 may be a tube cut in half having a length generally equivalent to that of the outer pipe 28. A plurality of fins 32 can extend from the inner plate or tube 30. The fins 32 can be constructed of one or more of various materials, for example, gold, silver, palladium, nickel (Ni), zinc (Zn), tin (Sn), indium (In), bismuth and copper. The fins 32 serve as hydrogen ion (H+) absorbers to reduce the pH in the contaminated water. In one embodiment, the pH of the water is reduced to below 7.0, preferably between about 6.4 and 6.8, in the manifold, which helps to prevent calcium carbonate ($CaCO_3$) and magnesium carbonate ($MgCO_3$) from precipitating out and collecting on the fins 32 thereby allowing the fins to remain clean for transforming reactive pollutants into stable ions and compounds. The fins 32 can also act to change or alter phosphates, salts, nitrites, nitrates and other reactive polluting contaminants from a reactive form to a nonreactive form. Further, the fins 32 may act as a catalyst to increase soluble oxygen in the water, which causes anaerobic bacteria to be destroyed, as anaerobic bacteria cannot survive in an increased oxygen supply in water. Therefore, with the increased oxygen, the anaerobic bacteria are prevented from growing and proliferating, which could have an adverse effect on the chemical processing of a frack well. As illustrated in FIGS. 3 and 4A, one or more ferromagnets 188 may be arranged within the horizontal pipe 30 in order to attract ferromagnetic elements. By stabilizing the magnetic spin of electrons at the atomic level, the spinning electrons in the $M_s$ orbital subshell may be controlled. In achieving this stability, the $M_s$ subshell may be altered when the water is introduced into a P dope N dope voltage accelerator, as discussed in greater detail below.

Figure 4B:
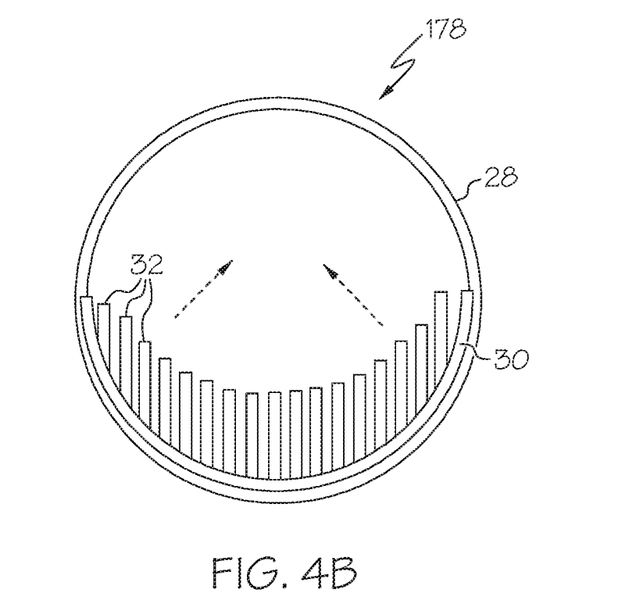
FIG. 4B is a schematic sectional end view of an absorptive manifold for reducing the pH of water in accordance with one embodiment of the present invention.

In one embodiment, as shown in FIG. 1, at least part of the manifold 174, for example the horizontal section 178, may include an electromagnet 34 in order to control electronmagnetic radiation. In one embodiment, for example in a batch-scale, pilot embodiment, the outer tube 28 is a 4-inch Type M copper pipe and the electromagnet 34 is attached to the inside of a 3-inch one half pipe at the highest pollution level water line. In this embodiment, the plate 30 can be a 3-inch diameter Type M copper pipe of generally equivalent length cut in half, as shown in FIGS. 3-4B.

In another embodiment, the hydrogen absorptive manifold 174 may comprise multiple vertically-stacked, perforated plates of various materials, for example, gold, silver, palladium, nickel, zinc, tin, indium, bismuth and copper. In one embodiment, the plates are constructed of thin sheets of gold, silver and bismuth. The plates may be contained in a pipe constructed of polyvinyl chloride (PVC) or other suitable material. The perforations in the various plates are not necessarily aligned with one another, in one embodiment, such that the water is required to flow across each plate as it is transferred through the hydrogen absorptive manifold 174. The plates can be adapted for replacement on a periodic basis.

An aerator 22 may be placed adjacent the exit end 24 of the filter compartment 20 in order to oxygenate the water as it flows from the clarifier 18.

As demonstrated in FIGS. 1 and 2, the system 10 can include a first container 36, such as a concrete containment basin (CCB) or other suitable barrel or tank, that has a P dope N dope voltage accelerator or regulator 38 associated therewith. The first container 36 is in fluid communication with the hydrogen absorptive manifold 174. After passing through the manifold 174, the water may then be directed to the first container 36. As shown in FIGS. 1 and 2, the voltage accelerator 38 may comprise a positively-charged cathode 40 connected to a positively-charged plate 42 and a negatively-charged anode 44 connected to a negatively-charged plate 46. The plates 42 and 46 are submerged in the water located in the first container 36 to induce a low voltage DC current through the water. The charge may be either 6V or 12V and have an amperage of 2, 10, 40 or 200 amperes, for example. By creating a charge on the dielectric constant, electrons are moved from one level to another in order to alter the atomic structure of each element and alter electron interaction. Optionally, light of various frequencies (and thus various colors) may be emitted into the water in container 36. In one embodiment, an ultraviolet light emitting device is located proximate the bottom of the container 36 and a red light emitting device is located proximate the top of the container 36.

The first container 36 can also include a filter 48 which may be in the form of a hanging bag containing pollutant collection substrates such as silicon dioxide ($SiO_2$), calcium carbonate ($CaCO_3$) and cadmium (Cd) to absorb chloride ions ($Cl^-$) and neutrons, including neutrons of barium (Ba). The container 36 may further comprise an oil snout 50 in connection with its discharge orifice or port 52, as shown in FIG. 1. As water passes through the oil snout 50, the oil snout 50 separates and captures oil and benzene ($C_6H_6$) molecules from the water. The oil and benzene collected by the oil snout 50 may be diverted to a container or barrel (not shown) and stored for later transportation, disposal or reuse.

A second container 54, such as a CCB or other suitable barrel or tank, may be provided downstream of and in fluid communication with the first container 36. Upon exiting the first container 36, the water may then pass in the second container 54. The second container 54 can include a stainless steel screen filter 56 through which the water passes for absorption separation and/or filtration of bacteria. The screen filter 56 may further comprise a variety of elements and compounds, such as nickel (Ni) and calcium carbonate ($CaCO_3$). Additionally, the second container 54 may also include another filter (not shown) which, like filter 48, may be in the form of a hanging bag containing pollutant collection substrates such as silicon dioxide, calcium carbonate and cadmium to absorb chloride ions and neutrons, including neutrons of barium. Furthermore, the second container 54 can also include seashells located therein.

From the second container 54, the water can be directed through a magnetron 190. The magnetron 190 generates a magnetic field which interacts with polluting elements in the water as it passes through the magnetron 190. The magnetron 190 may comprise a clear plastic pipe or tube 192 passing either through or adjacent to a microwave generating device of the magnetron 190. The tube 190 directs water through or adjacent to the microwave generating device. By bombarding the atoms of contaminants within the water with microwaves, the magnetron 190 alters the intrinsic angular momentum of the electrons in the outer or subatomic shell or subshell of those atoms. In other words, the magnetron 190 alters the fourth quantum number (i.e., spin projection quantum number, $m_s$) of the electrons in the outer or subatomic shell of those atoms. Prior to being subjected to the microwaves, those electrons have an initial spin of either +½ or −½, corresponding with "spin" (i.e., "spin up") and "opposite spin" (i.e., "spin down"), respectively due to Pauli's exclusion principle. The magnetron 190 alters those spins and, in one embodiment, reverses those spins. As such, in one embodiment, electrons having an initial up spin (i.e., $m_s$ of +½) are reversed to a down spin (i.e., $m_s$ of −½). Similarly, electrons having an initial down spin (i.e., $m_s$ of −½) are reversed to an up spin (i.e., $m_s$ of +½). With this alteration in spin, chemicals can be added to the water in the return tank 60 resulting in the precipitation of certain elements and contaminants in the water. The manipulation in spin allows for the coating of certain elements, which results in their precipitation.

In a batch-scale, pilot embodiment, the microwave generating device of the magnetron 190 may be, for example, a household microwave (such as Hamilton Beach Model P100N30ALS3B, 120V, 60 Hz, single phase, having an output of 1,000 W, 2,450 MHz). In larger-scale embodiments, larger microwave generating devices can be implemented.

From the magnetron 190, the water can be pumped into the return tank 60. The return tank 60 may include a port 204 through which chemicals or solutions may be added to the water. Since the spin of the electrons in the outer or subatomic shell of the atoms within the water have been altered or reversed by the magnetron 190, the added solution can affect the precipitation of the certain elements and contaminants in the water. In one embodiment, the solution added to the water via the port 204 may comprise an acidic solution of ethyl diamine, tetra-acidic acid, ethylenediaminetetraacetic acid (EDTA) and/or citric acid, as is present in, for example, lemon juice, orange juice, lime juice and other citric fruits. The solution may also comprise distilled water. The volume of the various acids added to the water is dependent upon the type and amount of contaminants in the water. The addition of these acids can disrupt the polar covalent bonds of the polluted water. These acids act as chelating agents and bind metals together for further chemical reactions.

The return tank 60 can also include a port through which the tank 60 may be pressurized by a compressed gas, such as $CO_2$, $O_2$ or the like. Oxygen may also be supplied to the water in the return tank 60. As mentioned above, an increase in soluble oxygen in the water causes anaerobic bacteria to be destroyed, as anaerobic bacteria cannot survive in such an environment. Therefore, the anaerobic bacteria are prevented from growing and proliferating, which could have an adverse effect on the chemical processing of a frack well.

Further, the return tank 60 may include a float that, when reaching a predetermined level, will activate a pump and/or valve 58, which may be in communication with the second container 54, to transfer additional water into the return tank 60. The float system of the return tank 60 may be, for example Model 21 or Model 221 manufactured by ITT McDonnell and Miller. The magnetron 190 may be wired in series with the pump 58 such that when the pump 58 is activated, the magnetron 190 is activated. The return tank 60 can also include a pump 194 in communication therewith for pumping water into the boiler 62. When the boiler 62 reaches a predetermined water level and requires additional water, the pump 194 is activated in order to pump water from the return tank 60 to the boiler 62.

The boiler 62 may be any suitable boiler and, in the illustrated batch-scale, pilot embodiment, is a Columbia Boiler Company CT-6/10 Steam Boiler with PowerFlame JR-15A-10 Burner. The boiler 62 boils the water to create steam, which then flows into a steam super heater 64. Whenever the system 10 is shut down, steam from the boiler 62 can be diverted to the blow down tank 206.

Once in the superheater 64, the saturated steam from the boiler 62 is heated to a temperature of between about 600° F. and 1,200° F. to prepare it for fractional separation. In one embodiment, the saturated steam is heated to a temperature of approximately 900° F. It will be appreciated that the superheater 64 may elevate the steam by 25° C. or more.

Figure 5:
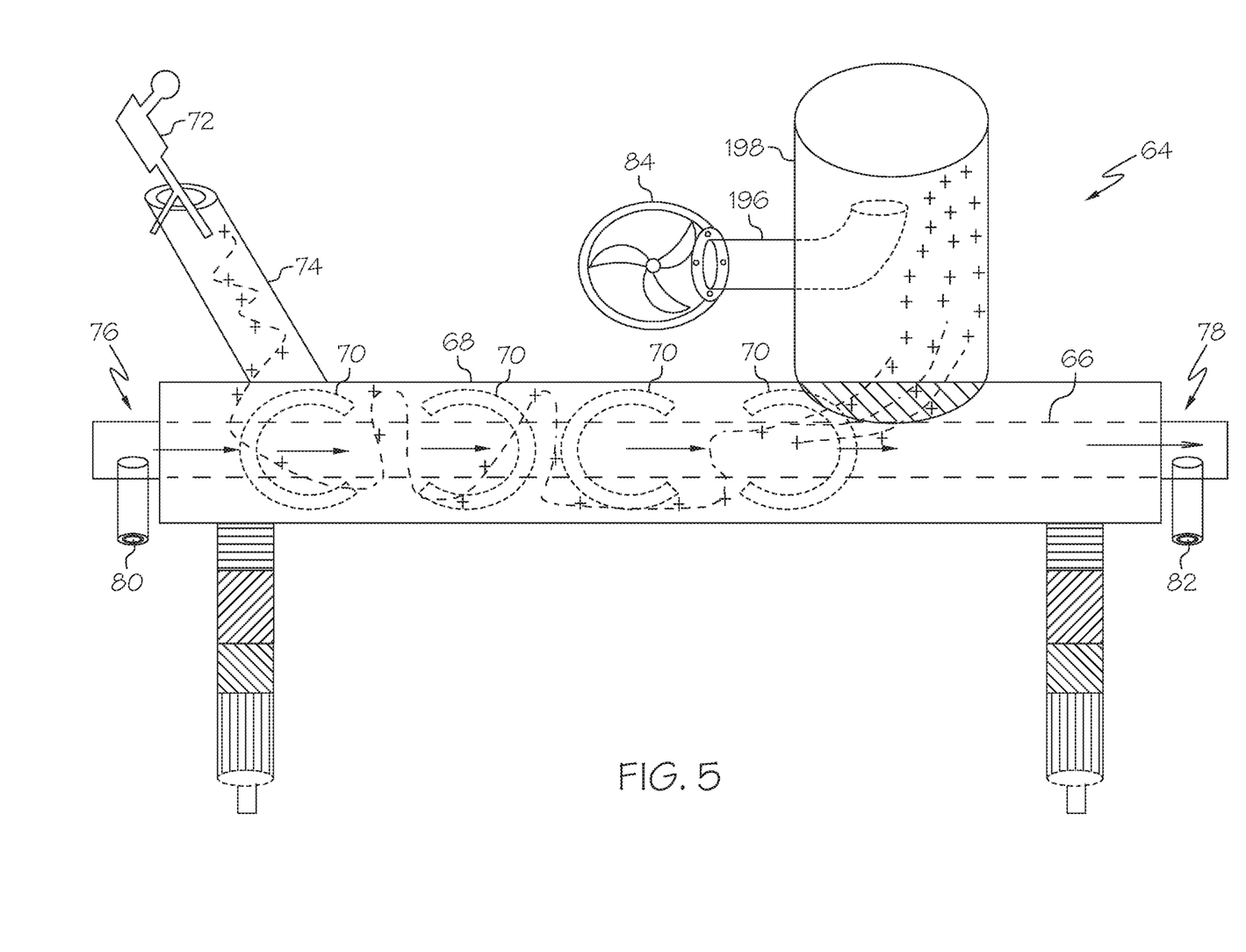
FIG. 5 is a schematic view of a superheater component for a system for treating contaminated water in accordance with one embodiment of the present invention.

As illustrated in FIG. 5, the superheater 64 comprises an inner pipe 66 located inside of an outer pipe 68, both of which may be constructed of stainless steel or other suitable material. The inner pipe 66 can include a plurality of circular gaskets 70 for flame dissipation of heat. A source of heat 72 can be inserted into a holder 74 attached proximate an upstream end of the outer pipe 68. Advantageously, a temperature differential in the steam between the entrance 76 of the superheater 64 and its exit 78 is created. To measure this temperature differential, thermometers 80 and 82 or other suitable temperature measuring devices may be positioned at each end 76 and 78 of the superheater 64 and optionally at locations therebetween. In order to further distribute heat evenly throughout the length of the superheater 64, a vacuum fan 84 may be connected proximate a downstream end of the superheater 64 as well. The fan 84 blows air through conduit 196, which exhausts via conduit 198, thereby creating a vacuum at the downstream end of the super heater 64 to pull heat from the heat source 72 through the super heater 64.

Figure 6:
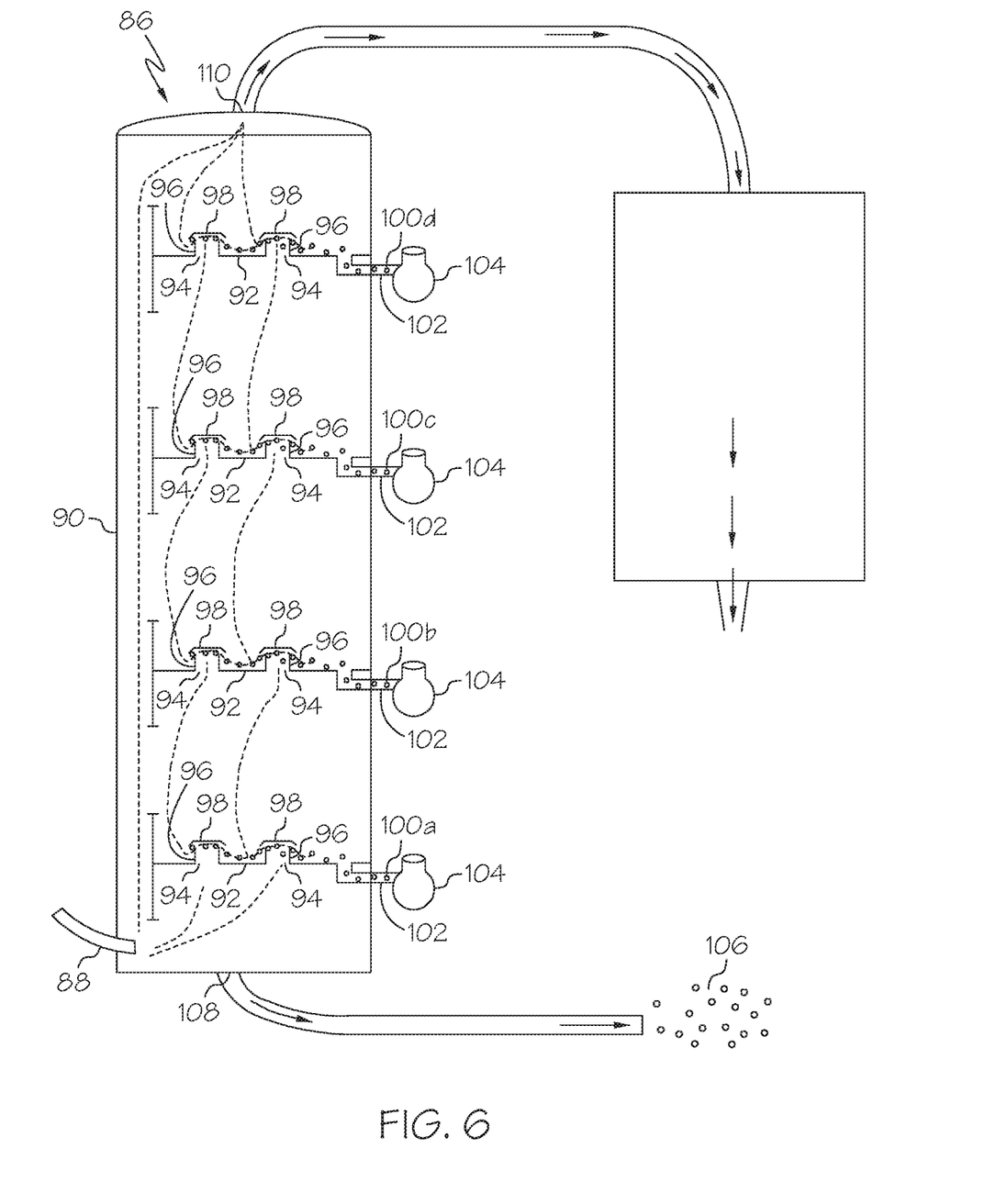
FIG. 6 is a schematic view of a fractional distillation column for a system for treating contaminated water in accordance with one embodiment of the present invention.
Figure 7A:
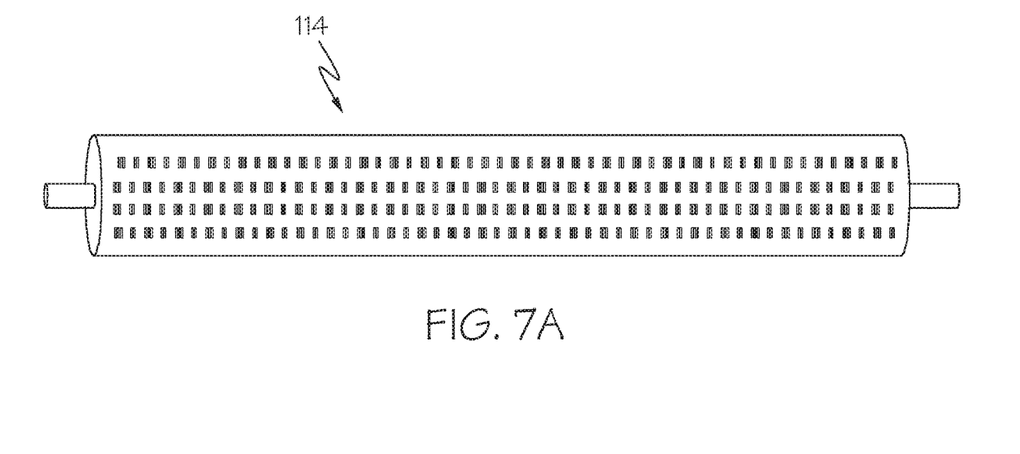
FIG. 7A is a sectional side view of a condensing unit in accordance with one embodiment of the present invention.
Figure 7B:
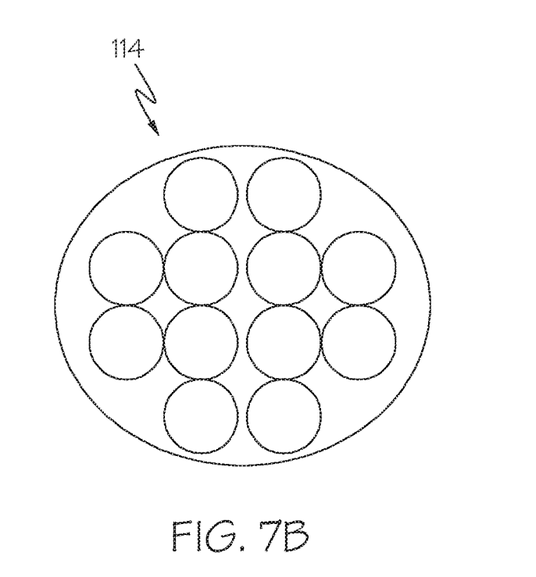
FIG. 7B is a sectional end view of a condensing unit in accordance with one embodiment of the present invention.

From the superheater 64, the superheated steam, which may be approximately 900° F., passes into a fractional distillation separator or column 86 through an inlet aperture 88 proximate a lower end of an outer shell 90. The fractional distillation column 86 is schematically illustrated in FIG. 6. The column 86 includes a plurality of internal plates or trays 92 having apertures 94 defined therethrough. Extending upwardly from each aperture 94 may be a pipe 96. A dome-shaped cap 98 may be welded or otherwise attached to a top end of each pipe 96. The caps 98 are configured for condensing elements by atomic mass units (amu). The condensed elements 100a, 100b, 100c and 100d may include heavy metals and/or radioactive materials, such as radium-226, radium-228, uranium-238 and uranium-235, for example. The condensed contaminants 100a, 100b, 100c and 100d flow out of the column 86 via apertures 102 and are collected in one or more catch containers 104 where they are stored for later removal, transportation and proper disposal. Other contaminates 106 may be discharged from the fractional distillation column 86 through a lower aperture 108 or bleed off port. The column outer shell 90, plates 92, pipes 96 and caps 98 may all be constructed of stainless steel or another suitable metallic material.

Purified steam can flow from an outlet aperture 110 proximate an upper end of the fractional distillation column 86 to into a condenser or heat exchanger 112 that may include two or more condensing units 114 organized in series or parallel for increased efficiency. The heat exchanger 112 may be a double pipe heat exchanger now known or hereafter developed, a shell and tube type heat exchanger, or any other suitable type of heat exchanger, and may operate similarly to heat exchangers commonly known in the art. Like the other components of the illustrated system 10, the heat exchanger 112 may be scaled up for use in a larger-scale system. As shown in FIGS. 1 and 2, the heated steam enters the first end 200 of the heat exchanger 112, is transferred from the first condensing unit 114 to the second condensing unit 114, and then exists the second end 202 of the heat exchanger 112. Cooling liquid can be provided to the heat exchanger 112 and may flow in an arrangement that is parallel to, counter to, or cross or perpendicular to the flow of the fluid (i.e., steam and/or water) being cooled and condensed. Upon exiting the heat exchanger 112, the fluid flowing therethrough has been condensed from a steam to a liquid. Once condensed, the purified water may be between about 85° F. and 110° F., for example.

Upon existing the heat exchanger 112, the water may be collected in a tank 116, which may have three outlets 118, 120 and 122. A first outlet 118 may be connected to a test tank 124 containing one or more living organisms, such as fish, for observation of the effects of the treated water on the living organisms in order to assist in monitoring the effectiveness of the treatment process by allowing observation of the living organisms' behavior and health in the treated water. A second outlet 120 can be connected to a line 126 that delivers the water back to the return tank 60 discussed above if it is determined that additional processing of the water is necessary for increased purification levels. At this point $CO_2$ or $O_2$ under low pressure may be injected into the return tank 60 through a control orifice for chemical adjustments of the polluted water. The water may be cycled through the boiler 62, superheater 64 and fractional distillation column 86 as many times as necessary to treat the water. Depending upon the flow rate of water entering the return tank 60 from the magnetron 190 and the flow rate of the water entering the return tank 60 from the return line 126, the float system may prohibit flow from either the magnetron 190 or return line 126. Typically, if the combined flow rates exceed the system's capacity, flow from the magnetron 190 is prohibited or restricted if necessary. A third outlet 122 is connected to an exterior faucet 128 for connection to a tank truck or directly back to the fracking water supply system for reuse, if desired.

Another aspect of the present invention is directed to the configuration of one or more of the systems 10. Multiple water treatment systems 10, as described herein, may be placed in series or parallel. The system 10 is readily scalable by adding similarly equipped trailers 12 to the system 10. When multiple trailers 12 are utilized, some of the system's 10 components may be located on one trailer 12, while other of the system's 10 components may be located on other trailers 12. The water treatment system 10 of the present invention may be centrally located for use by multiple well sites. Furthermore, it will be appreciated that the system 10 of the present invention can be suitable for treating any water, not just fracking water, flowback water and produced water from hydraulic fracturing operations.

Figure 8:
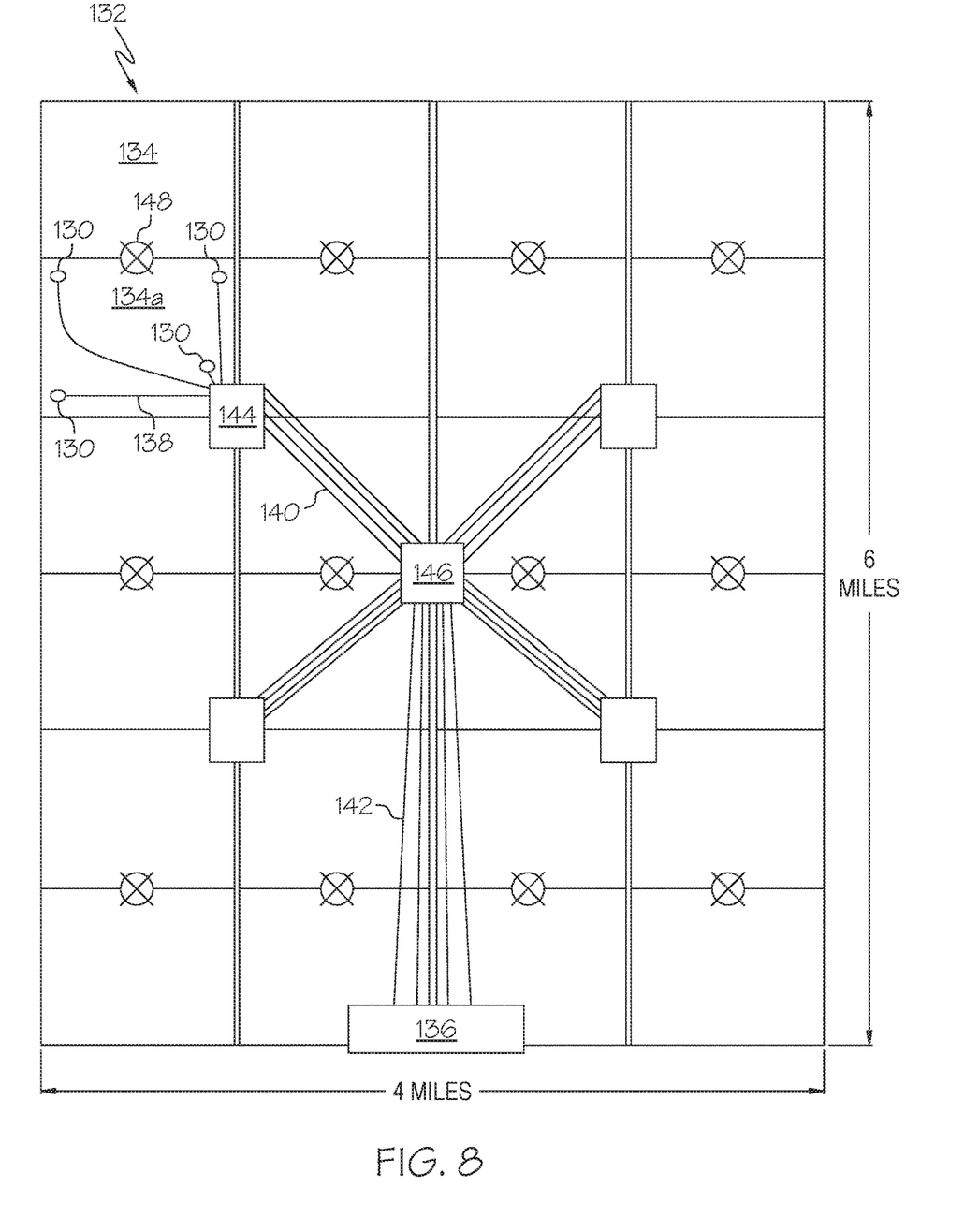
FIG. 8 is an overhead schematic layout of a multiple drilling site operation including a central water treatment plant in accordance with one embodiment of the present invention.
Figure 9:
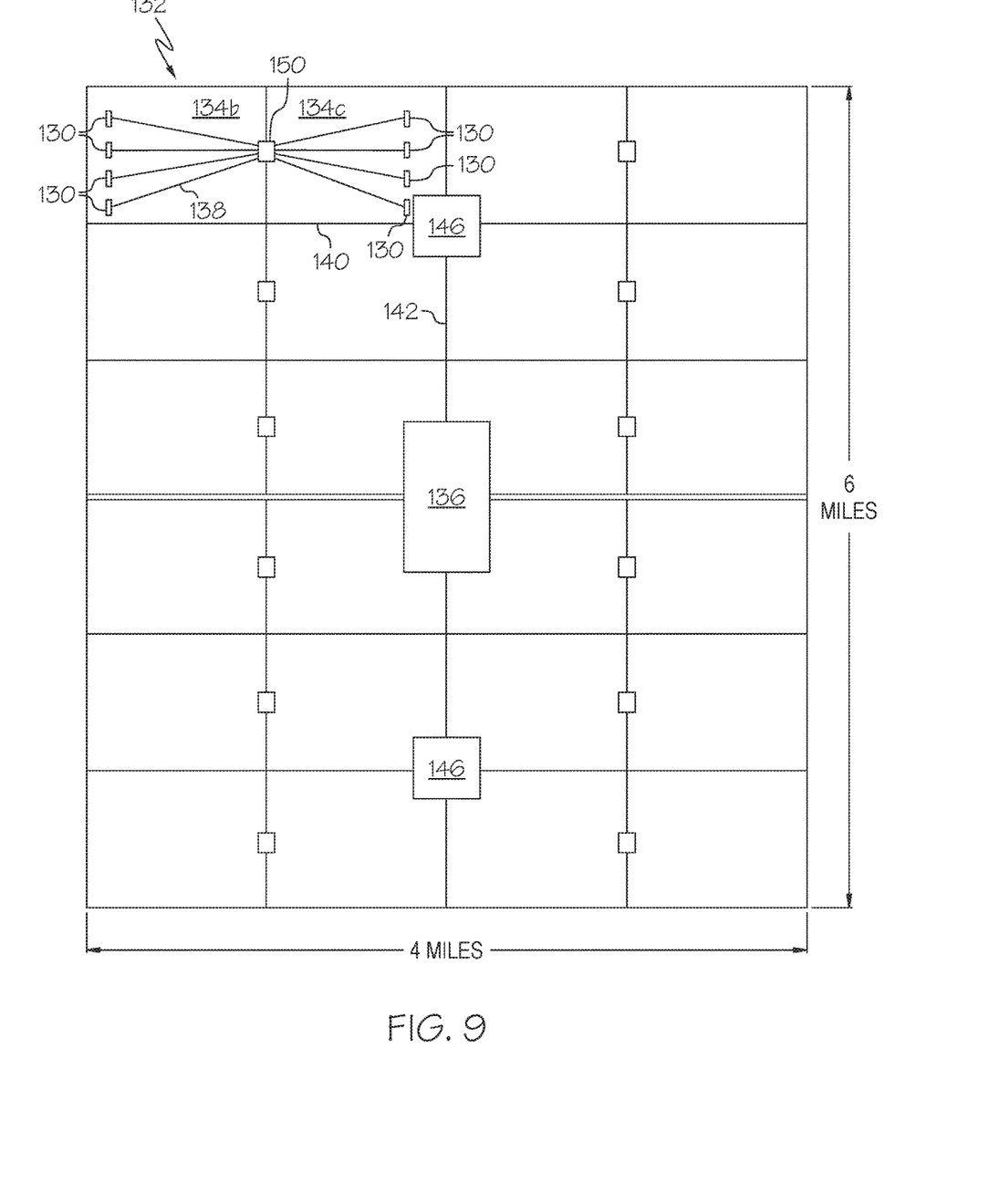
FIG. 9 is an overhead schematic layout of a multiple drilling site operation including a central water treatment plant in accordance with another embodiment of the present invention.

As illustrated in FIGS. 8 and 9, one or more of the water treatment systems 10 of the present invention may be centrally located for use by multiple well sites 130 or locations. FIGS. 8 and 8 each depict an area of land 132 that may consist of a plurality of square miles or sections 134. In one embodiment, the area of land 132 includes twenty-four (24) square mile sections 134. Each section 134 can include one or more well sites 130 having a well drilled thereon, as represented by sections 134a, 134b and 134c. In one embodiment, the area of land 132 includes sixty-four (64) well sites 130; however, it will be understood that any number of well sites 130 may be located within the area of land 132.

As demonstrated in FIG. 8, a central water treatment facility or plant 136 may be adapted and scaled for treating the contaminated water (e.g., fracking water, flowback water, produced water, etc.) associated with each of the well sites 130. The central plant 136 comprises one or more of the systems 10 of the present invention and may be set up on a mobile, temporary, semi-permanent or permanent basis, as desired. The water from each well site 130 may be transported to the central plant 136 by any suitable means, including but not limited to, piping, trench, channel, tanker truck or railcar. As illustrated by the well sites 130 placed on section 134a, the water from each of the well sites 130 may be transported to the central plant 136 via pipes 138, 140 and 142. Optionally, one or more satellite centers 144 and 146 are provided where the water may be collected from multiple well sites 130 for further transportation to a central plant 136. In one embodiment, the satellite centers 144 and 146 may suitably equipped for undertaking a portion of the water treatment process prior to the water being further transported to the central plant 136. The pipes 138 transporting the water from the well sites 130 to the satellite centers 144 and 146 may be of one diameter (e.g., 4 inch), while the pipes 140 and 142 transporting the water from satellite centers 144 and 146 to the central plant 136 may of another, larger diameter (e.g., 8 inch). As depicted in FIG. 8, the need for disposal wells 148 can be eliminated, as represented by each disposal well 148 having an "X" placed thereon. In the example shown, twelve (12) disposal wells 148 are eliminated.

Upon the water being treated at the central plant 136, the water may transported back to other well sites 130, for example via the pipes 142, 140 and 138, for use in the fracking process at those other well sites 130. In other words, the treated water may leave the central plant via a pipe 142, arrive at a first satellite center 146, be directed from the first satellite center 146 to a second satellite center 144 via a pipe 140, and then be directed from the second satellite center 144 to a well site 130 that is ready for fracking via a pipe 138. As such, the water may be used at one well site 130, be treated at the central plant 136, and then used again at another well site 130 upon treatment. Alternatively, the treated water may be discharged from the central plant 136 to a stream or other body of water or otherwise transported from the central plant 136 upon treatment.

FIG. 9 illustrates another embodiment wherein the central plant 136 is located at the center of the area of land 132. Initial processing stations 150, which may in the form of a filtering truck for example, may be provided for initial treatment of the water prior to the water being transported to the central plant 136. These initial processing stations 150 may take the place of, or be similar in nature to, the satellite centers 144. Like the embodiment shown in FIG. 8, the embodiment of FIG. 9 may also eliminate the need for disposal wells 148.

From the foregoing, it will be seen that this invention is one well adapted to attain all the ends and objects hereinabove set forth together with other advantages which are obvious and which are inherent to the structure. It will be understood that certain features and sub combinations are of utility and may be employed without reference to other features and sub combinations. This is contemplated by and is within the scope of the claims. Since many possible embodiments of the invention may be made without departing from the scope thereof, it is also to be understood that all matters herein set forth or shown in the accompanying drawings are to be interpreted as illustrative and not limiting. It will also be appreciated the components of the system need not be in the order shown in the figures and described above. Rather, depending upon the water to be treated, the components may be aligned or arranged in a different order. In some embodiments, some of the components may be bypassed if certain types of treatment are not necessary. In other embodiments, the water may be cycled through one or more of the components multiple times in order to achieve necessary purification levels.

The constructions described above and illustrated in the drawings are presented by way of example only and are not intended to limit the concepts and principles of the present invention. Thus, there has been shown and described several embodiments of a novel invention. As is evident from the foregoing description, certain aspects of the present invention are not limited by the particular details of the examples illustrated herein, and it is therefore contemplated that other modifications and applications, or equivalents thereof, will occur to those skilled in the art. The terms "having" and "including" and similar terms as used in the foregoing specification are used in the sense of "optional" or "may include" and not as "required". Many changes, modifications, variations and other uses and applications of the present construction will, however, become apparent to those skilled in the art after considering the specification and the accompanying drawings. All such changes, modifications, variations and other uses and applications which do not depart from the spirit and scope of the invention are deemed to be covered by the invention which is limited only by the claims which follow.

What is claimed is:

1. A water treatment system comprising:
    a first filter compartment containing filter material for removing at least one of chloride ions and transmuted chlorine ions from water and for absorbing neutrons from said water; and
    an absorptive manifold in fluid communication with said first filter compartment for absorbing hydrogen ions to reduce a pH of said water.

2. The water treatment system of claim 1, wherein said filter material comprises a first filter material for removing said at least one of chloride ions and transmuted chlorine ions and a second filter material for absorbing neutrons.

3. The water treatment system of claim 2, wherein said first filter material comprises at least one of coconut carbon, silicon dioxide and ionized sand.

4. The water treatment system of claim 2, wherein said second filter material comprises at least one of cadmium and bismuth.

5. The water treatment system of claim 1, wherein said absorptive manifold comprises an outer copper pipe, an inner copper plate or tube, and a plurality of fins extending from said inner copper plate or tube.

6. The water treatment system of claim 1, wherein said absorptive manifold comprises a plurality of fins within its interior.

7. The water treatment system of claim 6, wherein at least a portion of said fins are constructed of a material selected from the group consisting of gold, silver, palladium, nickel, zinc, tin, indium, and copper.

8. The water treatment system of claim 6, wherein at least a portion of said fins are adapted for absorbing hydrogen ions.

9. The water treatment system of claim 6, wherein at least a portion of said fins are adapted for altering at least one of a phosphate, a salt, a nitrite and a nitrate from a reactive form to a nonreactive form.

10. The water treatment system of claim 1, wherein said absorptive manifold includes a conduit connected with an electromagnet.

11. The water treatment system of claim 1 further comprising an aerator for oxygenating said water.

12. The water treatment system of claim 1, wherein said first filter compartment comprises:
    an upper section having at least one of ionized silicon dioxide, activated carbon and graphite therein;
    a middle section having cadmium therein; and
    a lower section having bismuth therein.

13. The water treatment system of claim 1, wherein said absorptive manifold comprises:
    a generally vertical section having palladium therein; and
    a generally horizontal section having at least one of palladium, gold, silver, nickel, zinc, tin, indium, bismuth and copper therein.

14. A water treatment system comprising:
    a filter compartment containing a filter material, said filter material including:
        ionized silicon dioxide for removing at least one of chloride ions and transmuted chlorine ions from water; and
        cadmium and bismuth for absorbing neutrons from said water; and
    a manifold in fluid communication with said filter compartment, wherein said manifold includes palladium therein for absorbing hydrogen ions.

* * * * *